Dec. 12, 1933.                V. S. DURBIN                1,939,296
                               CAR BRAKE
                            Filed July 13, 1932
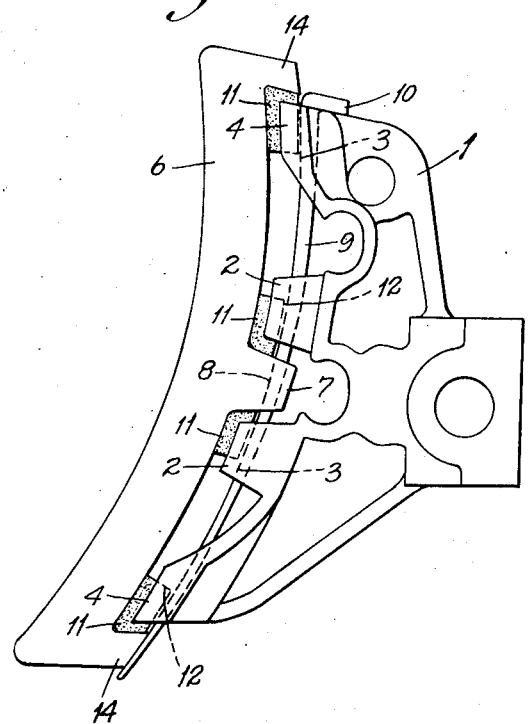
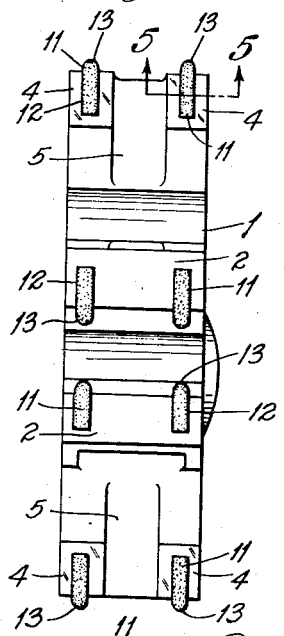
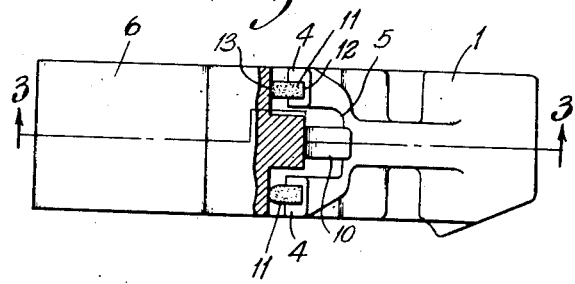
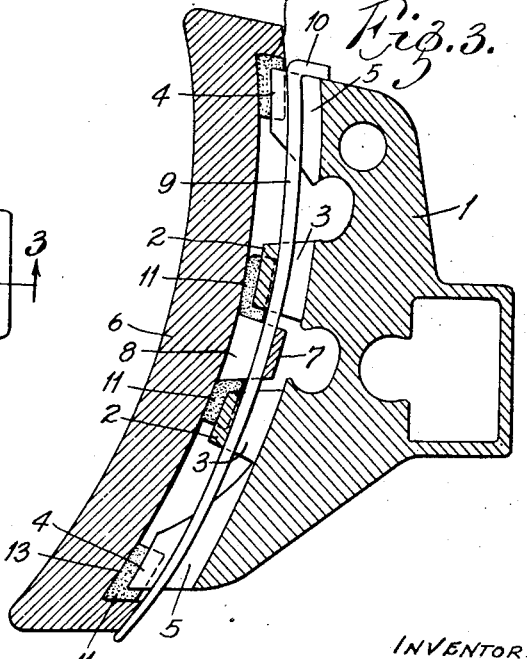
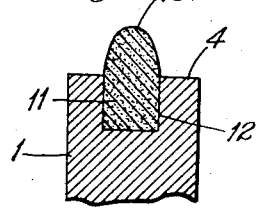
INVENTOR.
VOTAW S. DURBIN.
BY Bruce S. Elliott
ATTORNEY.

Patented Dec. 12, 1933

1,939,296

UNITED STATES PATENT OFFICE 1,939,296

CAR BRAKE

Votaw S. Durbin, St. Louis, Mo.

Application July 13, 1932. Serial No. 622,271

4 Claims. (Cl. 188—243)

This invention has for its general object to provide novel means for preventing wear between the brake head and brake shoe of a railway car brake.

As is generally known to those familiar with railway equipment, a brake head is secured on each end of the brake beam, and each brake head is provided with apertured lugs. The brake shoe is provided on its rear face with a central apertured lug which, when the brake is applied to the brake head, fits loosely in the space between the two lugs of the brake head, and a curved metal key, substantially of the length of the brake head, is inserted between the brake head and brake shoe in a manner to pass through the apertures in the two sets of lugs, and thus removably hold the brake shoe in place on the brake head.

The construction thus briefly described is standard, and when the brake is in operative position, that is, not applied to a car wheel, the brake shoe, even if comparatively securely fixed to the brake head by the key, rapidly works loose and is subject to constant vibration, or movement relative to the brake head. The brake head is of relatively soft metal, usually of malleable iron, while the brake shoe is made of chilled cast iron. The result, therefore, of the continual movement of the shoe relative to the head results in rapidly wearing away the latter, so that it is not of infrequent occurrence that a brake head will be worn away and rendered unfit for further use after ten or twelve hours of continuous service.

The expense involved in buying new brake heads, coupled with the labor involved in removing the brake beam from the car, securing the brake heads on the ends thereof, and remounting the brake beam on the car, constitutes one of the costliest items of repair, or replacement, in the operation of a railroad. In addition, it is known that loose brake shoes add enormously to the noise of a running train.

I am aware that attempts have been made, largely by the use of a special construction of spring key, to secure a tight fit between the brake shoe and the brake head, but all such attempts, so far as I am aware, have produced only temporary results, and the situation above described as to loose brake shoes, with the resultant wear on the brake head, represents the normal condition as to these parts on railways generally.

According to my invention, I interpose between the meeting faces of the brake shoe and the brake head, and between the meeting sides of the interlocking lugs on these parts cushions, or bumpers, which not only prevent the metal surfaces from coming in contact, but operate to hold the brake shoe in a substantially fixed position on the brake head, so that relative movement between these parts is reduced to the minimum. While some movement will of necessity occur, this does not result in wearing away the brake head, because, as stated, my improved construction prevents contact between the surface of the brake shoe and that of the brake head.

In practice, I preferably employ rubber inserts, or blocks, located on the brake head in a manner hereinafter described, as the means for preventing contact between the surfaces of the brake shoe and the brake head, or the respective lugs thereon; but other character of cushion or bumper, or other material different in resiliency from rubber, could be employed without departing from the spirit of my invention.

In the accompanying drawing,

Figure 1 is a view in side elevation of a railway car brake comprising a brake head having a brake shoe secured thereto by a key, and showing my improved cushion members interposed between the brake head and the brake shoe;

Figure 2 is a plan view of the brake partly broken away to better illustrate the construction;

Figure 3 is a central longitudinal sectional view taken on the line 3—3 of Figure 2 and viewed in the direction of the arrows;

Figure 4 is a bottom plan view of the brake head, showing my improved cushion members mounted therein; and Figure 5 is an enlarged sectional detailed view taken on the line 5—5 of Figure 4, illustrating the shape of one of the rubber inserts.

Referring now to the drawing, the numeral 1 indicates the brake head, which is of conventional construction and design. Such a brake head is formed on its under side with two spaced retaining lugs, 2, which are longitudinally apertured as indicated at 3, and with end lugs or retaining members, 4, shown more particularly in Figures 1, 3 and 4. These end lugs or retaining members are separate, in each instance, by longitudinal grooves, 5, which form a seat or recess for receiving the locking key, later referred to.

The numeral 6 indicates a brake shoe, which on its inner side is usually provided with a single retaining lug, 7, which is longitudinally apertured as indicated at 8. The numeral 9, Figures 1 and 3, indicates a curved metal key which is usually provided at one end with a head, 10, made by bending one end of the bar from which the key is made.

Ordinarily the brake shoe 6 is placed in position on the brake head with its lug 7 inserted between the lugs 2, and the key 9 is then inserted between the brake head and shoe and through the apertures 3 and 7 of the interlocking lugs, the head 10 engaging against one end of the brake head and the opposite end portions of the key resting in the grooves 5 located, respectively, at opposite ends of the brake head, as shown by Figure 4.

The construction thus far described is conventional and is almost universally employed in this country, while some modifications of this construction have been proposed, such as using two lugs on the brake shoe instead of one, and using a spring key of a construction designed to exert pressure in such manner as to hold the brake shoe in fairly firm engagement with the brake head, such modifications do not substantially change the nature of the construction which characterizes the conventional car brake as illustrated.

From the illustration, and the description thereof given thus far, it will be apparent no very firm engagement between the brake shoe and brake head is possible, and as stated in an earlier part of this specification, it is substantially true that with all car brakes now in use the brake shoe, however tight at first, will become loose in a quite short period of use, with the result that due to the incessant movement and vibration thereof produced by the movement of the train, the brake head is rapidly worn away, and new brake heads must be substituted for old ones at quite frequent intervals.

According to my invention, I mount on the inner face of the brake head a series of cushion members, 11, which, as shown by Figure 5, are preferably in the form of rubber blocks having parallel sides inserted in grooves 12 in the respective sets of lugs 2 and 4 of the brake head, and provided with rounded sides and ends 13. As shown by Figures 1 and 4, the cushion members 11 project beyond the inner faces of the lugs 2 and inward beyond the inner sides of said lugs, and the cushion members or inserts in the retaining members or lugs 4 project beyond the inner face of said lugs and outward beyond the ends thereof. The brake shoe 6 is provided at opposite ends with shoulders, 14, which are adapted to engage over the opposite ends of the brake head.

From the above description of the invention, it will be readily seen that with a brake shoe applied in position in the usual way on a brake head of conventional construction, but provided with my improved cushion members, the lug 7 on the brake shoe will be engaged on opposite sides by the inner ends of the rubber inserts or blocks 11, and the inner side of the brake shoe adjacent the sides of the lug 7 will rest upon the outer side of the cushion members 11 inserted in the lugs 2. At the same time, the shoulders 14 of the brake shoe will engage the outer ends of the rubber inserts mounted in the end retaining lugs 4, and the inner face of the brake shoe adjacent the inner sides of the lugs 14 will bear against the outer sides of said inserts. When the key 9 is inserted in position the engagement of the lug 7 with the central inserts 11, and of the shoulders 14 with the end inserts 11, is quite firm, and in all events the metal surfaces of the parts of the brake shoe are at all times held out of contact with the complementary parts of the brake head. Thus all movement of the brake shoe relative to the brake head occurring in the movement of the train will be cushioned, and not only will excessive rattling and noise be prevented, but all wear ordinarily produced by the frictional engagement between the brake shoe with the brake head, will also be prevented. Thus the life of the brake heads will be prolonged indefinitely, and, aside from accidental breakage, a car brake will require no repair until the brake shoe has worn down to a point where it is too thin to withstand the braking pressure, when, of course, new brake shoes will be substituted for the old ones. This is a simple process, and is effected by withdrawing the key 9, putting a new brake shoe on the old brake head and then reinserting the key into locking position as before.

While I have illustrated my invention in connection with a brake of conventional design, I wish it understood that the broad idea of my invention resides in cushioning the brake shoe on the brake head in a manner to maintain the metal of the brake shoe out of contact with the metal of the brake head, irrespective of the particular design or construction of the brake, or the parts thereof.

I claim:

1. In combination with a brake head having apertured lugs and a brake shoe mounted thereon having an apertured lug inserted between the lugs on the brake head, cushion members inserted in the lugs of the brake head and projecting beyond the outer faces and inner sides thereof, and a key inserted in the apertures of said lugs and operating to hold the inner side of the brake shoe and the outer sides of the lug thereon in contact with the cushion members of the brake head.

2. A railway brake comprising a brake head and a brake shoe having interlocking lugs, a key passed through said lugs and locking the brake shoe on the brake head, and cushion members mounted on the brake head and operating to hold opposed surfaces of the brake shoe and brake head out of contact with each other.

3. In combination with a brake head having spaced retaining lugs at its central portion and end retaining members, cushion members inserted in said retaining lugs and projecting beyond the outer ends and the inner sides of said lugs, cushion members inserted in said end retaining members and projecting beyond the inner sides and the outer ends thereof, a brake shoe having a lug adapted to be inserted between the lugs on the brake head and engaging the cushion members thereof, and shoulders at its ends passing over and engaging the cushion members of said end retaining members, and removable means for locking said brake shoe in position on the brake head.

4. A brake head of conventional design having its end retaining members and its central retaining lugs provided with rubber inserts projecting beyond the surfaces thereof exposed to contact with the complementary parts of a conventional brake shoe when the latter is secured in position on the brake head.

VOTAW S. DURBIN.